United States Patent
Jiang et al.

(10) Patent No.: US 6,515,717 B1
(45) Date of Patent: *Feb. 4, 2003

(54) COMPUTER-BASED SYSTEM FOR PRODUCING MULTI-COLOR MULTILAYER IMAGES ON SUBSTRATES USING DRY MULTI-COLORED CHOLESTERIC LIQUID CRYSTAL (CLC) PIGMENT MATERIALS APPLIED TO BINDER MATERIAL PATTERNS

(75) Inventors: Yingqiu Jiang, Sunnyvale, CA (US); Le Li, Yorktown Heights, NY (US); Sadeg Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,984

(22) Filed: Aug. 28, 1998

(51) Int. Cl.$^7$ .............................. G02T 1/13; B32B 5/16
(52) U.S. Cl. .......................... 349/2; 347/101; 349/17; 428/1; 428/70; 428/76; 428/327
(58) Field of Search .................................. 106/400, 493, 106/499; 428/1, 31, 68, 70, 76, 141–143, 147, 323–327, 329, 330, 331, 411.1, 688, 689; 349/2, 17; 347/101

(56) References Cited

U.S. PATENT DOCUMENTS

| | | | |
|---|---|---|---|
| 3,650,603 A | | 3/1972 | Heilmeier et al. |
| 4,114,990 A | | 9/1978 | Masb et al. |
| 4,312,268 A | | 1/1982 | King et al. |
| 4,388,453 A | | 6/1983 | Finkelmann et al. |
| 4,410,570 A | | 10/1983 | Kreuzer et al. |
| 4,637,896 A | | 1/1987 | Shannon |
| 4,943,816 A | | 7/1990 | Sporer |
| 4,944,578 A | | 7/1990 | Denison |
| 5,096,862 A | * | 3/1992 | Mathers et al. ............... 501/98 |
| 5,132,147 A | | 7/1992 | Takiguchi et al. |

(List continued on next page.)

FOREIGN PATENT DOCUMENTS

| | | |
|---|---|---|
| EP | 0506 176 A1 | 3/1993 |
| EP | 0 606 940 A2 | 7/1994 |
| GB | 2 010 529 A | 6/1979 |
| GB | 2 017 579 A | 10/1979 |
| WO | WO 96/02016 | 1/1996 |

OTHER PUBLICATIONS

A Single–Layer Super Broadband Reflective Polarizer. by Le Li and Sadeg M. Faris., SID International Symposium, Digest of Tech Paper, vol. 27, 1996, pp. 111–113.

Wide–Band Reflective Polarisers From Cholesteric Polymer Networks With a Pitch G by D.V. Broer et al., Nature, vol. 378, 1995, pp. 467–469.

Reflective Cholesteric Polariser Improving the Light Yield of Back–and Side–Ligh by D.J. Broer, et. al., International Display Research Conference 1995, 1995, pp. 735–6.

(List continued on next page.)

Primary Examiner—H. Thi Le

(57) ABSTRACT

A computer-based system for producing a multi-color multilayer image on a substrate using multi-colored cholesteric liquid crystal (CLC) pigment materials made from CLC flakes tuned to predetermined bands of color. A computer-controlled image generator automatically generates an image specifying a pattern over which binder material is to be applied to a substrate by a binder material applicator. A plurality of CLC pigment applicators automatically apply patterns of different-color CLC pigment material to a pattern of binder material applied to the substrate, binding thereto as the binder material dries. An output device is used to automatically return the substrate to a different one of CLC pigment applicators after each application of a pattern of different-color CLC pigment material to the pattern of binder material. The output device automatically repeats the return of the substrate to the CLC pigment applicators until all bands of color in the multi-color multilayer image are rendered and the multi-color multilayer image is produced.

8 Claims, 3 Drawing Sheets

U.S. PATENT DOCUMENTS

| | | | |
|---|---|---|---|
| 5,188,760 A | | 2/1993 | Hikmet et al. |
| 5,196,241 A | | 3/1993 | Burke et al. |
| 5,319,478 A | | 6/1994 | Funfschilling et al. |
| 5,412,492 A | | 5/1995 | Zammit et al. |
| 5,427,828 A | | 6/1995 | Park |
| 5,457,554 A | | 10/1995 | Faris |
| 5,486,935 A | | 1/1996 | Kalmanash |
| 5,506,704 A | | 4/1996 | Broer et al. |
| 5,665,450 A | * | 9/1997 | Day et al. .................. 428/114 |
| 5,691,789 A | | 11/1997 | Li et al. |
| 5,699,743 A | | 12/1997 | Ganz et al. |
| RE35,739 E | * | 2/1998 | Ellison et al. ................ 428/31 |
| 5,834,064 A | * | 11/1998 | Dietz et al. ............. 427/388.1 |
| 5,837,160 A | * | 11/1998 | Dietz et al. ............ 252/299.01 |
| 5,851,604 A | * | 12/1998 | Muller-Rees et al. .......... 428/1 |
| RE36,457 E | * | 12/1999 | Ellison et al. ................ 428/31 |
| 6,034,753 A | | 3/2000 | Li et al. |
| 6,072,549 A | * | 6/2000 | Faris et al. ................... 349/16 |
| 6,181,395 B1 | | 1/2001 | Li et al. |
| 6,394,595 B1 | * | 5/2002 | Jiang et al. ................ 347/101 |

OTHER PUBLICATIONS

Terraces in the Cholesteric Phase of DNA Liquid Crystals by David H. VanWinkle, et. al., J. Chem. Phys., vol. 97, No. 8, 1992, pp. 5641–5646.

Polarizing Color Filters Made From Cholesteric LC Silicones by Robert Maurer, et. al., SID 90 Digest, 1990, pp. 110–113.

Orientation of Liquid Crystals in a Spherical Volume by G. M. Zharkova and S. I. Trashkeev, Sov. Phys. Crystallogr., vol. 34, No. 3, 1989, pp. 414–417.

Hydrodynamics instabilities of Cholesterics Under a Thermal Gradient by E. Dubois–Violette, Le Journal de Physique, vol. 34, No. 0, 1972, pp. 107–113.

Scarabaeid Beetle Exocuticle as an Optical Analogue of Cholesteric Liquid Crysta by A. C. Neville and S. Caveney, Biological Reviews of the Cambridge Philo. Soc., vol. 0, No. 0, 1969, pp. 531–562.

Supplementary European Search Report, 1998.

* cited by examiner

COMPUTER-BASED SYSTEM FOR PRODUCING MULTI-COLOR MULTILAYER IMAGES ON SUBSTRATES USING DRY MULTI-COLORED CHOLESTERIC LIQUID CRYSTAL (CLC) PIGMENT MATERIALS APPLIED TO BINDER MATERIAL PATTERNS

RELATED CASES

The following applications are related to the present invention: application Ser. No. 9/093,017 filed Jun. 5, 1998; application Ser. No. 09/093,006 filed Jun. 5, 1998; now U.S. Pat. No. 6,369,868; application Ser. No. 09/039,303 filed Mar. 14, 1998, now abandoned; application Ser. No. 09/039,297 filed Mar. 14, 1998, now U.S. Pat. No. 6,072,549; application Ser. No. 08/891,877 filed Jul. 9, 1997, by Le Li and Sadeg Faris, now U.S. Pat. No. 6,377,325; application Ser. No. 08/739,467 filed Oct. 29, 1996 by Sadeg M. Faris, Le Li, and Yingqiu Jiang Jiang, now U.S. Pat. No. 6,034,753; application Ser. No. 08/890,320 filed Jul. 7, 1997 by Sadeg M. Faris and Le Li; application Ser. No. 08/805,603 by Sadeg M. Faris and Le Li, filed Feb. 26, 1997, now U.S. Pat. No. 5,940,150, which is a continuation-in-part of: application Ser. No. 08/739,467, by Sadeg M. Faris and Le Li filed Oct. 29, 1996, now U.S. Pat. No. 6,034,753, which is a is a Continuation-in-Part of application Ser. No. 08/550,022 (Now U.S. Pat. No. 5,691,789) by Sadeg M. Faris and Le Li filed Oct. 30, 1995; application Ser. No. 08/787,282 by Sadeg M. Faris filed Jan. 24, 1997, now U.S. Pat. No. 6,338,807, which is a Continuation of application Ser. No. 08/265,949 filed Jun. 2, 1994, now U.S. Pat. No. 5,599,412, which is a Divisional of application Ser. No. 07/798,881 by Sadeg M. Faris filed Nov. 27, 1991, now U.S. Pat. No. 5,364,557; application Ser. No. 08/715,314 by Sadeg Faris filed Sept. 16, 1996, now U.S. Pat. No. 6,188,460; application Ser. No. 08/743,293 by Sadeg Faris filed Nov. 4, 1996, now U.S. Pat. No. 6,133,980. Each of the above identified Applications and patents are commonly assigned to the assignee of the present invention, and are incorporated herein by reference in their entirety.

BACKGROUND OF THE INVENTION

1. Field of Invention

This document describes a technology for painting and image printing that utilizes a simple system with multiple colorants and a single printing head through which the image is printed by a transparent ink or binder. The primary area of interest involves dry pigments of larger molecular weight colorants, such as cholesteric liquid crystal (CLC) pigments, and their diverse applications in modern printing and painting. In addition, new techniques can be easily expanded to serve more functions, such as 3-D stereoscopic image capability.

2. Brief Description of the Literature

Broadband reflecting polarizers were introduced in application Ser. No. 08/550,022 (now U.S. Pat. No. 5,691,789) entitled "Single Layer Reflective Super Broadband Circular Polarizer and Method of Fabrication Therefor" by Sadeg M. Faris and Le Li which was filed Oct. 30, 1995. Such broadband polarizers are made by producing a single layer having cholesteric liquid crystal order where the pitch of the liquid crystal order varies in a non linear fashion across the layer.

General references on polymer dispersed liquid crystals may be found in detail in "Polymer Dispersed Liquid crystal displays", by J. W. Doane, a chapter in "Liquid Crystals", Ed. B. Bahadur, World Scientific Publishing, Singapore, and "CLC/polymer dispersion for haze-free light shutters, by D. Yang et al. Appl. Phys. Lett. 60, 3102 (1992).

Since the early attempt of utilizing cholesteric film as optical filters and the effort on polymer encapsulated nematic liquid crystals for display, much attention has been focused on trying to bring polymeric liquid crystals and cholesteric liquid crystals together to make devices for light control application. (See, for example J. Adams, W. Hass, J. Dailey, Journal of Applied Physics, 1971, and J. L. Fergason, Society for Information Display Digest, 1985.). The above identified U.S. patents and other references are hereby incorporated by reference.

INTRODUCTION

In modern society, information exchange plays an important role. Efficient methods to convey information rely on high-quality communication devices. Among them, printing and painting devices are becoming more and more important. Currently, ink-jet, bubble jet, and laser printing, along with off-set, flexo press, and screen printing are universally used. All of these printing techniques possess a common feature. In order to perform color printing, multiple nozzles or screens must be used for cyan, magenta, yellow and black colorants. This forces the printing system to become mechanically complex and limits the system from being able to be expanded to serve multiple functions such as the case of 3-D printing. In addition, since the printing nozzles and screens have a very fine apertures, they can't handle those colorants with relatively larger pigment particles.

Furthermore, it has been known that CLC can be used as a colorant for painting and printing because of their excellent spectral characteristics and wide color range properties. However, special techniques must be employed in order to use CLC. Special surface treatments and curing methods are all necessary to print and dry CLC films. As a result, CLC has never been practically used in real artwork or other applications. However, the present invention of the new CLC ink based on CLC pigment solves all these problems at once. No special surface treatment and curing equipment is required to dry and/or cure the colorant. Another benefit is the capability of generating colorful 3-D stereoscopic images since the CLC ink reflects polarized light.

OBJECTS OF THE PRESENT INVENTION

One objective of this invention is to improve today's printing technologies. The inventors of the present invention have developed a new printing technology that offers a simple system configuration, greater flexibility, improved printing quality, and enhanced functionality. The new technique is termed Dry Printing Technology (DPT) by its working principle. It uses only one printing head and prints images with an invisible ink. It can handle, in principle, all kinds of colorants, even colorants with larger pigments so that it removes the pigment size constraint in ink jet nozzle printing. By adopting a new printing head combined with CLC pigments, dry printing offers enhanced image quality. Finally, DPT can be easily expanded to print a colorful picture in 3-D with the CLC pigments.

Another objective is the application of the invented printing technique using a newly developed, novel colorant to achieve unique display effects that usual technologies do not possess. The ink is made from CLC pigments mixed into a suitable optically clear carrier.

Yet another objective is to give printing devices more flexibility and enhance their functionality.

Yet another objective is to achieve a special visual effect of objects which appear to have different colors depending on the viewing angle.

Yet another objective is to create 3-D stereoscopic images in full color at any size.

Yet another objective is to provide security printing

Yet another objective is to provide unique cosmetic effects.

Other objects, advantages, and novel features of the present invention will become apparent from the following detailed description of the invention when considering in conjunction with the accompanying drawings.

SUMMARY OF THE PRESENT INVENTION

The present invention provides a method of using flat flakes of non metallic reflecting pigment by applying the flakes to a surface and ensuring that the flakes lie substantially parallel to the surface. A binder material may first be adhered to the surface in a pattern or uniformly. The flakes are applied to the surface, and stick where the binder has been prepared. The flakes are applied so that they lie parallel to the surface, or the flakes are applied, then rolled or buffed to align them parallel to the surface. If the flakes are CLC flakes, multilayer polymer flakes, or multilayer inorganic material flakes, an iridescent film which changes color with viewing angle may be produced.

DETAILED DESCRIPTION OF THE PRESENT INVENTION

The present invention, termed "Dry Printing Technology" (DPT), enables many new applications to surface. The central part of the new technology is to print an image with an optically clear ink through a single printing head followed by an applying of CLC pigments.

Figure 1:
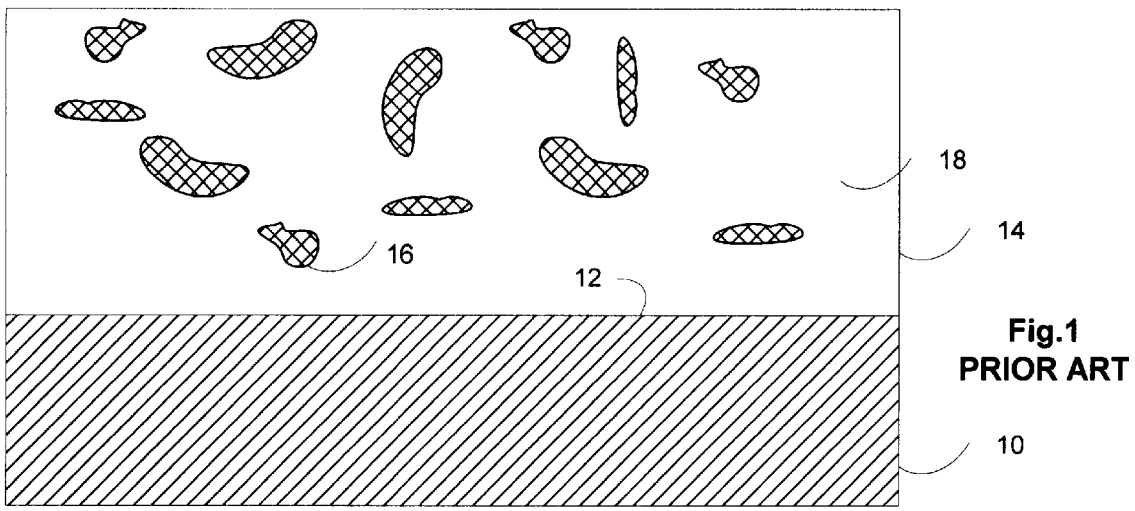
FIG. 1 shows a prior art "paint layer".

FIG. 1 shows an object 10 having a surface 12 covered with a prior art "paint layer" 14. The paint layer 14 generally comprises pigment particles 16 dispersed in a binder material 18.

Figure 2:
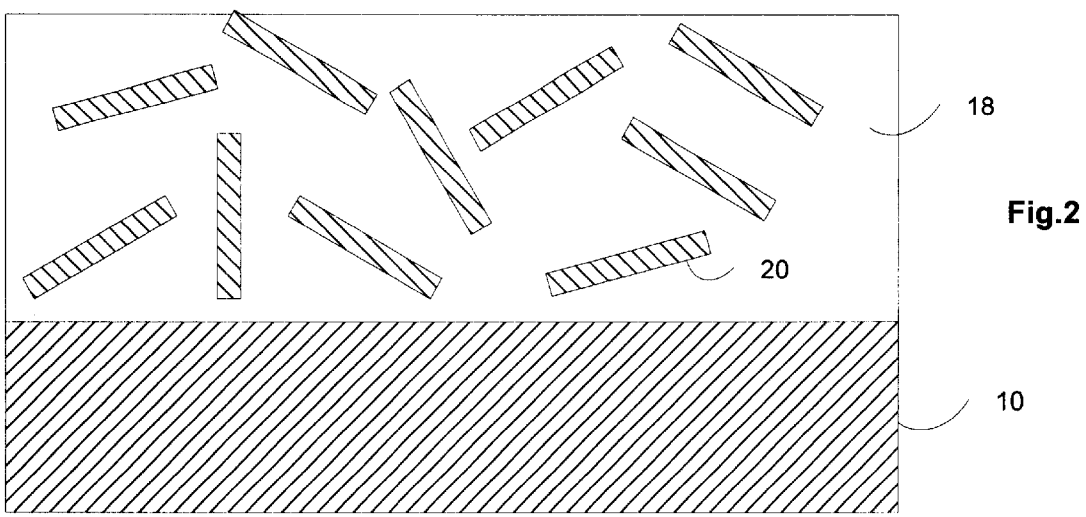
FIG. 2 shows a pigment material is in the form of flakes.

FIG. 2 shows a paint layer like FIG. 1 where the pigment material is in the form of flakes 20. The flakes 20 are shown randomly dispersed in the binder material 18. For reflective non metallic pigment particles like CLC flakes, multilayer polymer material flakes, or inorganic multilayer material flakes which have reflectivity by virtue of the interference effect of light reflection from a spatially varying index of refraction, the angle of viewing is critical, and no coherent effect is gained when the eye sees a large collection of pigment particles at many different angles. The use of CLC flakes is described in detail in copending application Ser. No. 08/787,282 entitled "Cholesteric Liquid Crystal Inks" by Sadeg M. Faris filed Jan. 24, 1997, and in application Ser. No. 07/798,881 entitled "Cholesteric Liquid Crystal Inks" by Sadeg M. Faris filed Nov. 27, 1991, now U.S. Pat. No. 5,364,557. Multilayer polymer reflecting material in sheet form and flake form is well known, as are multilayer inorganic coating for reflective and antireflective coatings optical substrates. The CLC flakes can be manufactured so that the pitch of the helix of the CLC molecules is non-linear, as detailed in the above mentioned patent applications, and so the flakes are broad band reflectors. In a similar way, the pitch of the polymer and inorganic multilayer films can be changed throughout the films to produce broad band reflecting flakes.

Figure 3:
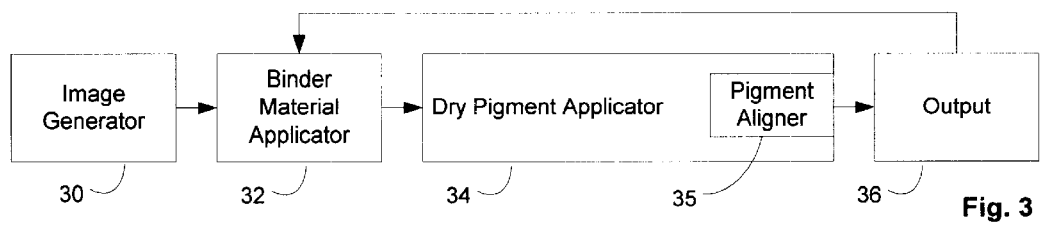
FIG. 3 shows a flow chart of the apparatus of the invention.

FIG. 3 shows a flow chart of apparatus of the the invention. The Image Generator 30, which may be a computer, photograph, silk screen, image plate, or manual drawing, provides the information to be printed. The image is transmitted to a means for applying a binder material, or the Binder Material Applicator module 32, which is one of the fundamental components of the Dry Printing technology. Pictures or images are printed in the most preferred embodiment using a transparent ink or binder material rather than a conventional colorant. Transparent binder material allows the printing process to be repeated many times to build layers of different color pigment material. An alternative embodiment allows use of a light absorbing binder material to bind light reflective pigment particles. Light which is not reflected from the pigment particles passes through the pigment particles and is absorbed in the light absorbing binder so that only the color reflected from the pigment particles may be seen.

Equally important, the means for transparent ink or binder printing may employ techniques from most printing technologies. For example, ink-jet, bubble jet, and laser printing, as well as flexo press, off-set, gravure printing and silk screen printing may serve as the methods and apparatus for transparent ink printing in module 32 However, minor changes and/or modifications might be required to the pre-existing printing systems to account for transparent ink printing conditions such as printing heat or environment. Printing with a binder or invisible ink allows the use of pigment particles of any size, since the pigment particles do not have to pass through the nozzles, screens, or other devices used to print normally. While particles and flakes of less than 40 or 50 microns diameter give good resolution and pass through most printers without clogging, larger pigments particles which may be used for special effects are difficult to use.

Dry Pigment Application by module 34 is another central part of the unique dry printing process. Before the invisible ink pattern provided by module 32 is completely cured, dry pigments are applied by module 34 to the ink surface to cover the printed area. The dry pigments adhere to the patterned surface in the pattern printed by the means for applying binder material 32. The dry pigments may be removed from the surface which has no binder material by shaking, vacuuming, or other standard way of removing dry powder from a surface. The dry pigments are, in the most preferred embodiments, either commercially available, conventional absorptive pigments or the novel non metallic reflecting CLC pigments or other iridescent flakes. Flakes of other absorptive pigment materials are also anticipated by the inventors. The CLC flakes and other multilayer flakes give spectacular reflective layer effects, and may also be used in transmission, for they transmit those colors which they do not reflect. Other dry pigments are also anticipated by the inventors. Dry pigment applicator 34 may contain multiple colorants, such as reflective red, green, blue, and white (RGBW) pigments, which are applied onto a black surface; or, absorptive cyan, magenta, yellow, and black (CMYB) pigments that are applied onto a white surface.

Furthermore, the applicator 34 may have another mechanism 35 to mechanically align pigments, which is of great importance in the usage of CLC pigments or other pigments which are in the form of flakes. As a result, all the dry flake pigments are uniformly oriented and layered on the flat surface. The output device 36 allows for the visualization of the colorful image. The output device 36 may also include a means for returning the object being printed to the binder material applicator 32 to apply another pattern for another color pigment or for another polarization reflecting pigment. The output device 36 may also have a device for applying a protective coating to protect the binder layer and pigment layer or layers.

FIG. 3 may also be used to describe a process whereby no image is printed in transparent ink printing module 32, but a uniform coating of binder material is laid on a surface, such as the surface of an automobile, and dry pigments are applied to the surface by device 34 to produce striking effects using CLC pigment flakes. The CLC pigment flakes may be composed of two layers, a left handed polarization layer and a right handed polarization layer, whereby light incident on the flake is 100% reflected. Such flakes may be produced, for example, by coating a layer of alignment material such as polyimide on to a flat surface, buffing the polymide surface to produce an aligned surface layer, deposition of a first polarization CLC coating on the aligned surface layer to produce a reflector of light of a first polarization, and immediately depositing a layer of a second polarization CLC material on to the first polarization CLC coating. The top surface of the first polarization CLC coating is itself aligned and will force the second polarization CLC coating to align and act as a reflector for light of the second polarization. Thereafter the first polarization and second polarization coatings are removed in the form of flakes which are reflective of both polarizations.

FIG. 3 may also be used to describe a process whereby a uniform coating of binder material is laid on a surface in transparent ink printing module 32, and dry pigments are applied to the surface in a pattern in module 34. The pattern is then fixed by fusing or otherwise curing the binder material.

Figure 4:
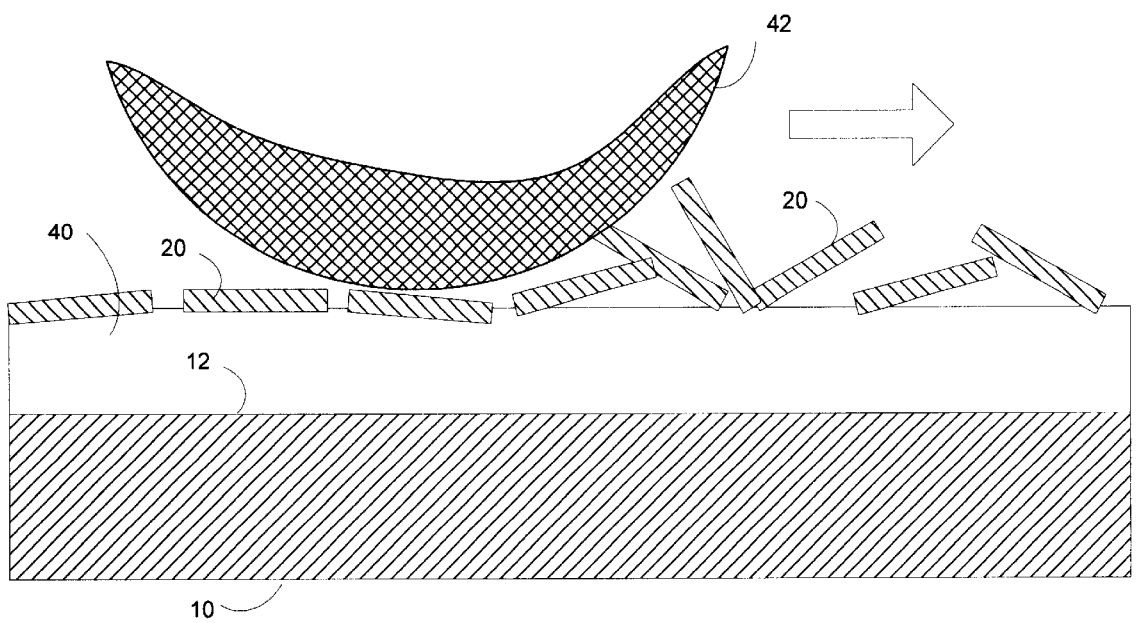
FIG. 4 shows an embodiment of the invention.

FIG. 4 shows an object 10 which has a binder coating 40 applied to the surface 12 of the object. Pigment flakes 20 have been applied to the surface of the binder coating 40, and are being rolled or buffed by the object 42 so that the pigment flakes 20 lie substantially parallel with the surface 12 of the object 10.

Figure 5:
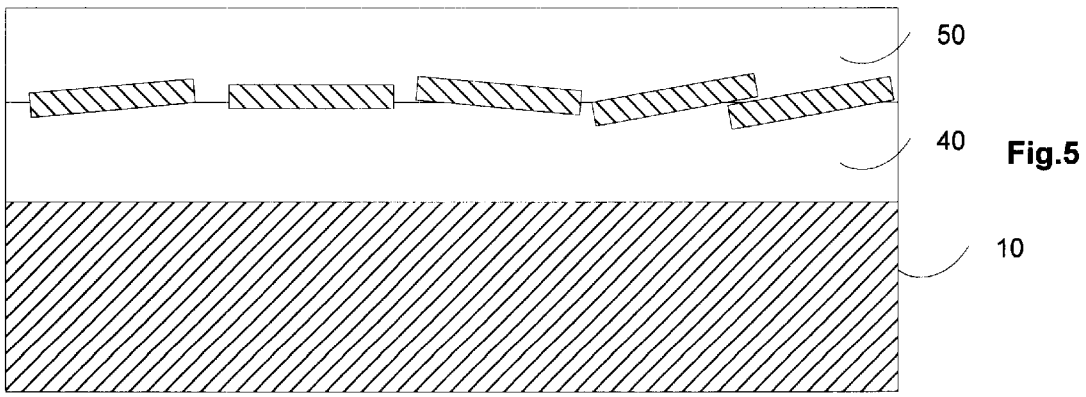
FIG. 5 shows an embodiment of the invention.

FIG. 5 shows the result of the preparation of FIG. 4 when another layer 50 of material is applied over the flakes 20 and binder material 40 as a protective layer. It is an embodiment of the invention to have either the binder material 40 or the material of protective layer 50 or both have an index of refraction equal to the mean index of refraction of the flakes 20. In this way, light will not scatter from the edges of the flakes 20 and wash out the iridescent effects gained by the interference of light within the flakes 20.

Figure 6:
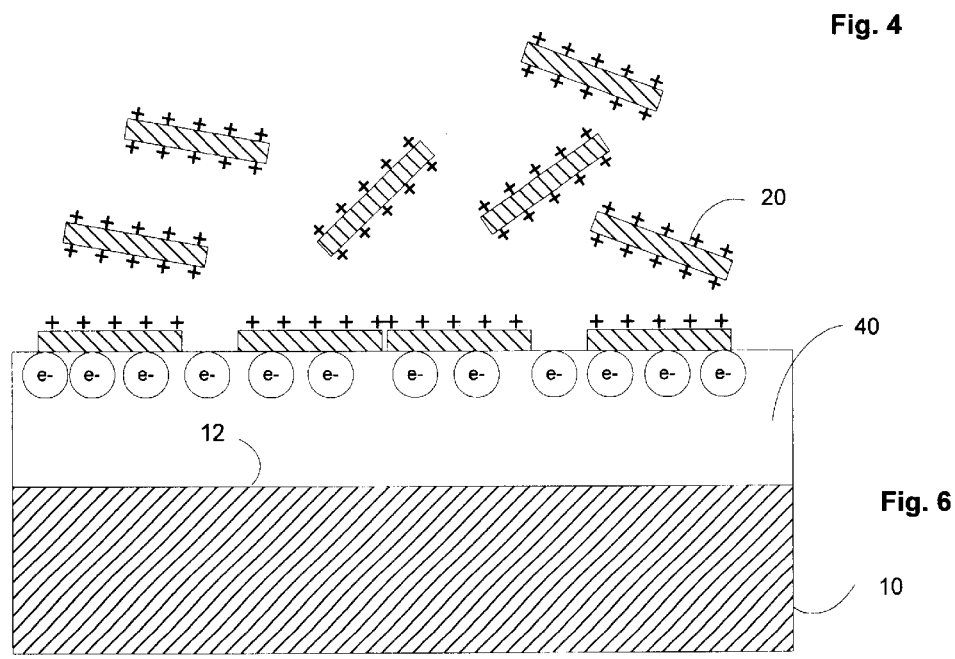
FIG. 6 shows an alternative embodiment of the invention

FIG. 6 shows an alternative embodiment of the invention where the flakes 20 are electrically charged and caused to lay down on the surface of the binder material by an electrical field at the surface of the binder material 40. If the dimensions of flakes 20 are sufficiently large compared to the thickness of flakes 20, the flakes will lie down substantially parallel to the surface 12. Such techniques allow the use of flakes 20 with large length and width dimensions compared with the thickness of the flakes 20. A brilliant sparkling effect is created when flakes 20 are larger than 100 microns. Even more preferred are flakes with mean transverse dimensions greater than 150 microns.

Figure 7:
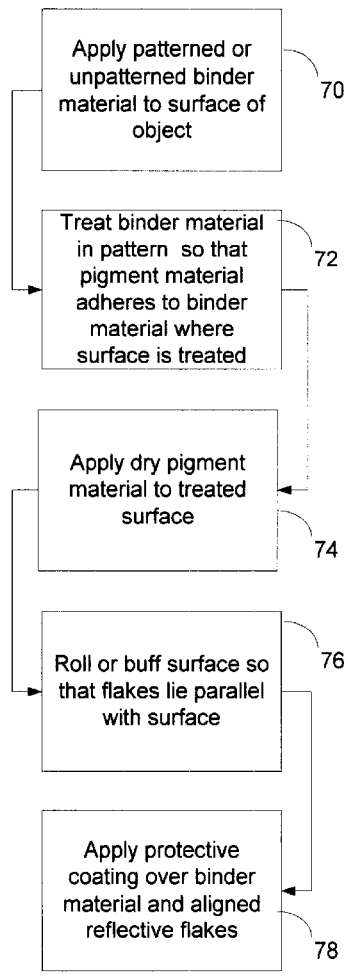
FIG. 7 is a flow chart of the method of the invention.

FIG. 7 is a flow chart of the method of the invention. Step 70 involves applying a binder material to the surface of the object. The binder material may be patterned or unpatterned. In a preferred embodiment, the binder material is applied as a liquid in a pattern, and the dry pigment material is applied in step 74 directly to the patterned binder material while the binder material is wet. The dry pigment sticks to the wet binder material, and may be shaken off or otherwise removed from the surface of the object where no binder material has been applied. In a preferred embodiment, the pigment material is rolled or buffed in step 76 to align the pigment material flakes parallel to the surface of the object. In another preferred embodiment, the binder material may be dry, and the surface prepared in step 72 in a pattern by applying a solvent material such as water to the surface in a pattern so that the pigment material sticks in a pattern. In another embodiment, the surface of the object may be coated with a binder material that may be fused, like a wax. The binder material is fused in a pattern and the pigment material applied so that the pigment material sticks to the fused binder material In another embodiment, the binder material may be coated with dry pigment first, and the binder material fused or coated with a solvent to "fix" the pigment material in a pattern. It is generally preferred that the dry pigment material is not fused in the fixing operation of fusing the binder material. A final step involves applying a protective coating in step 78. The protective coating may be transparent, or may be colored for special effects. The index of refraction of the protective coating 78 may match the mean index of refraction of the flakes in order to cut down scattering from the edges of the flakes. The index of refraction of the binder material may also match the mean index of refraction of the flakes for the same reason.

Figure 8:
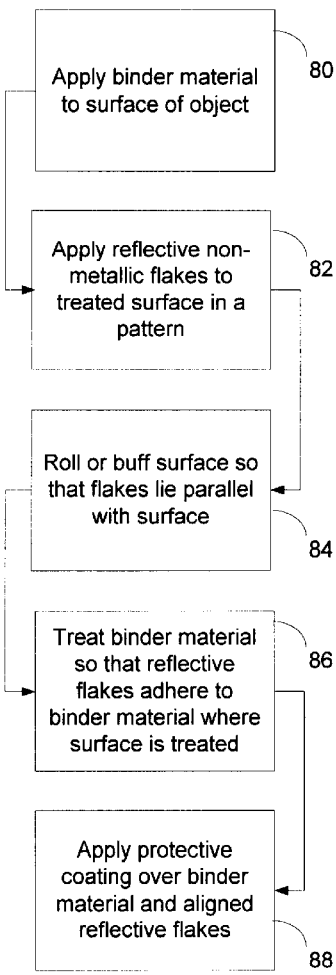
FIG. 8 is a flow chart of a preferred embodiment of the invention.

FIG. 8 is a flow chart of a preferred embodiment of the invention where a binder material is coated on the surface of an object in step 80, and then flakes of pigment are deposited in a pattern. Such flakes can be deposited by electrostatic means as in a xerographic photocopier, for example. After the flakes are deposited in step 82, the surface of the object may be worked by rolling or buffing to align the flakes parallel to the surface as shown in step 84. The flakes may be firmly adhered to the surface in step 86 by treating the surface with a solvent or by fusing the binder material. Once again, the surface may be protected by applying a protective layer in step 88.

Figure 9:
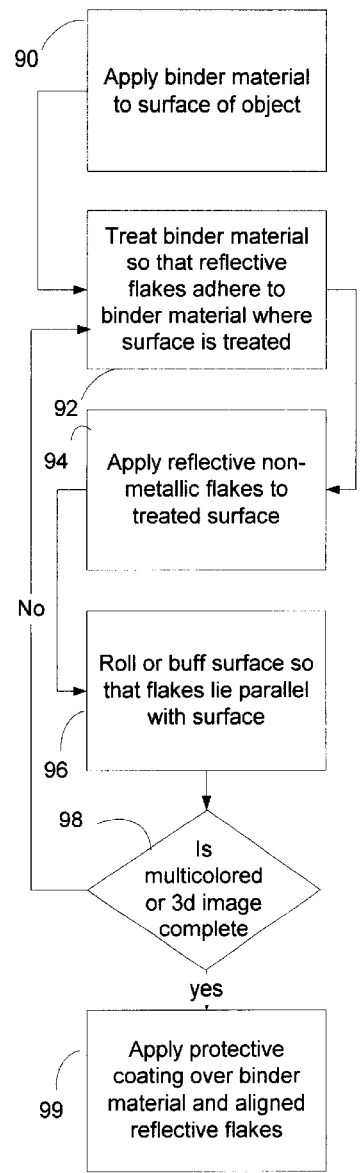
FIG. 9 shows a flow chart of a preferred embodiment of the invention.

FIG. 9 shows a flow chart of a preferred embodiment of the invention, in that the steps of the previous embodiments discussed above may be repeated in steps 90, 92, 94, 96 and 99 for different colors of pigments or different polarization reflection characteristics of pigments. The decision step 98 sends the system back around the loop until the required multiple color or multiple dimension image is complete.

The following is a detailed description encompassing specific applications of transparent printing as well as pigment application utilized in present printing technology processes. RBGW colorants will be used in the discussion, however, cyan, magenta, yellow and black (CMYB) colorants are also applicable.

1. DPT via Printing Screen

In this technology, the printing screen carries the image to be printed. One screen is needed for each one color printing. To print colorful image, four screens are needed that represent red, green, blue, and white (RGBW) colorants. For printing in 3-D using RGBW CLC colorants, eight screens are then needed. The first four (RGBW) are for the right image perspective, and the other four (RGBW) for the left image perspective. Typically, reflective pigments are applied to a black background which absorbs all the light which is not reflected, while absorptive pigments are applied to a white background which reflects all light which is not absorbed. To print single color pictures, the optically clear ink image is printed onto the substrate through the screen. Before the ink has completely dried, CLC pigments are spread onto the surface of the carrier followed by a mechanical alignment brush. If necessary, a top coating will be applied to protect the image.

To print full color image, RGBW is printed in an arbitrary sequence. For example, the red image is printed in transparent ink onto the carrier through the "red color" screen. Then red CLC pigments are applied. Next, after the red image has completely dried, the green image is printed using the appropriate image screen and green CLC pigments are applied. The same procedure is then applied to printing the blue and white images. To print colorful image in three dimensions, the above procedure is repeated for both left and right image perspectives with left and right handed RGBW CLC pigments.

2. DPT via Painting Brush/Spray

This technology is particularly important in, but not limited to, painting an object such as an automobile. First of all, a carrier (such as a primer etc.) is painted onto an object via sprayer or brush. Before the carrier dries, the CLC pigments are spread onto the object followed by mechanical brushing to orient the CLC pigments. Finally, a protective coating is applied over the CLC paint if necessary. This method can also be used to paint colorful pictures in 3-D in large size. The procedure is very similar to the screen printing technology described above.

3. DPT via Xerox/Laser Printer

The existing photo xerography and laser printing technologies can be modified to use the CLC pigments as their colorants. In these processes, the black carbon toner is replaced with CLC pigments. As experimentally proven, CLC pigments can be easily charged via static electric field, which is a necessary condition for Xerox and laser printing. In contrast to the xerography process, the pigment particles are not fused to the uncoated paper, but the non-fusible pigment particles which are deposited on a binder coated paper are fixed to the paper by fusing, for example, the binder material. The sheet being printed is stable after one color is printed, and may be sent through the same or another xerography process to add other colors or other polarization CLC flakes to the partially printed sheet.

4. DPT via Ink Jet Printer/Bubble Jet Printer

The same principal is applied in this case as in the screen-printing. The image is printed using the clear carrier through the ink jet or bubble jet printer. Then, the CLC pigments are applied before the carrier is dried followed by a mechanical brushing for alignment. The same procedure as with screen-printing is applied for printing full color pictures as well as color 3-D images.

5. DPT via Wax Printer

First, the wax binder layer, which may be coated on a thin film or on a paper sheet, is thermally melted. Then, the CLC pigments are sprayed onto the "wet" wax surface followed by a mechanical brush before the wax solidifies. In an alternative embodiment, the CLC pigments are deposited in a pattern and aligned on wax which is coated onto a thin film. RGB and White CLC wax foils are prepared in a similar way. The image may be transferred from a foil to paper by pressing the foil and paper together and heating to transfer the wax and the pigment from the foil to the paper surface. Therefore, an image is printed. If RGB and white wax foils are made with left and right handed CLC pigments separately, then colorful 3-D printing will be achieved via this technology.

6. DPT via Off-set Printer and Gravure Printer

A similar technique used for screen printing can be used in off-set printing technology as well. Image is first printed with the clear carrier. Then CLC pigments of one color are sprayed and brushed before the carrier is completely dried. Also, the 3-D picture can be printed with the left and right handed CLC pigments.

7. DPT on Pre-treated Substrates

This method applies to all the printing technologies mentioned above. Rather than printing images with a clear carrier, which is either thermally or photon curable, this technique prints the image with a solvent or a solution, which reacts with pre-coated surface on the substrate. For example, the solvent can be water and the agent that is pre-coated on the substrate surface is polyvinyl alcohol (PVA). It is well known that PVA is dissolvable into water. In this particular case, image is printed onto the substrate surface with the water through the printer head. Before the water dries, the CLC pigments are sprayed and brushed. This principle can be further generalized to create colorful pictures by screen printing, off-set, Gravure, ink jet, bubble jet, Xerox or laser printing and even in 3-D. In addition, this method is also suitable for painting. Further generalization of this technology can yield another method. The object to be painted is first wholly painted with a wet carrier that might be thermally or UV curable. Then, a pattern is printed with a fast drying coating through a printing device. The area covered by this coating is no longer sticky to the CLC pigments. However, the remaining area where not covered with such coating can still adhere to the CLC pigments. Therefore, image is created. This method is then termed as "negative" as compared to the previous methods. Furthermore, the new printing technologies can be generalized to the situation where ordinary absorptive CMYB pigments are used instead of the CLC pigments.

Applications of the New Invention

There are many applications that may be explored using this new printing technology. A first application is in automobile painting. Using the new painting technology, CLC pigments can be painted flat onto an automobile body such that a color change occurs when viewing angle changes.

A second important application is security printing. CLC pigments are printed flat using the new technology to ensure a color change versus the viewing angle. This characteristic is difficult to counterfeit. In addition, the security pattern will change when viewed with circular polarizing filters. Of great interest in this area is the usage of IR CLC pigments which are particularly suitable for machine vision application.

A third application is in general painting using CLC or multilayer organic or inorganic reflective pigments as the colorant for decoration as well as for energy saving. Since the light energy is not absorbed, but reflected, less energy will be used for air conditioning in a house painted with reflective paint.

A fourth application is in cosmetics. CLC pigments used as finger nail polish, skin colorants, and eyeshadow offer spectacular effects. In particular, binder material applied first to a fingernail, then flakes which are rubbed to align them are very effective. Very large flakes of about 100 or 150 microns give a striking "glitter" effect. One other example is the use of such reflective pigments in sunblock. Multilayer flakes with a non-liner pitch may reflect a broad band of wavelengths, and in particular block ultraviolet light in the UVA and UVB bands. Normal sunblock lotion uses organic molecules to absorb the ultraviolet light, but the bandwidth of such molecules is normally too small to effectively block both the UVA and UVB bands. Pigment materials such as zinc oxide and titanium dioxide are very white, and are not appealing. Broadband reflecting flakes, however, reflect the ultraviolet light and are colorless in the visible spectrum. Such broadband reflecting flakes may also reflect the infra-red light as well and lead to a cooling effect when the infrared rays of the sun are reflected from the skin instead of absorbed by the skin. Flakes of such broadband ultraviolet and infrared reflecting characteristics and visible transmitting characteristics are anticipated by the inventors.

The methods noted above are examples which may be generalized by one of skill in the art to provide many additional embodiments which are anticipated by the inventors.

Obviously, many modifications and variations of the present invention are possible in light of the above teachings. It is therefore to be understood that, withing the scope of the appended claims, the invention may be practiced otherwise then as specifically described.

We claim:

1. A computer-based system for producing a multi-color multilayer image on a substrate using multi-colored cholesteric liquid crystal (CLC) pigment materials made from CLC flakes tuned to predetermined bands of color, said computer-based system comprising:

a computer-controlled image generator for automatically generating an image specifying a pattern of spatial extent over which binder material is to be applied to a substrate during the first stage of a series of dry printing operations, and wherein a different color pigment material is applied to said pattern of binder material during subsequent stages of the series of dry printing operations, and wherein each said different color CLC pigment material is made from CLC flakes tuned to a predetermined band of color required to render said multi-color image;

a binder material applicator for automatically applying a pattern of binder material to said substrate in accordance with said image generated by said computer-controlled image generator, wherein said binder material has predetermined drying characteristics to permit each said different color pigment material to be applied to said pattern of binder material during said series of dry printing operations and prior to said pattern of binder material becoming completely dried;

a plurality of CLC pigment applicators, each said CLC pigment applicator automatically applying a pattern of different-color CLC pigment material to said pattern of binder material during one said subsequent stage in the series of dry printing operations, and said pattern of different-color CLC pigment material binds to said pattern of binder material as said pattern of binder dries in accordance with its said predetermined drying characteristics and said CLC flakes in each said pattern of different-color CLC pigment material lie substantially parallel with the surface of said substrate; and an output device for automatically returning said substrate to a different one of said plurality of CLC pigment applicators after each application of one said pattern of different-color CLC pigment material to said pattern of binder material, so that said different one of said plurality of CLC pigment applicators can automatically apply another pattern of different-color CLC pigment material to said pattern of binder material to advance the dry printing of said multi-color multilayer image on said substrate, and said output device automatically repeating the return of said substrate to said plurality of CLC pigment applicators until all bands of color in said multi-color multilayer image are rendered and said multi-color multilayer image is produced on said substrate.

2. The computer-based system of claim 1, wherein said binder material comprises an optically transparent binder material.

3. The computer-based system of claim 1, wherein said binder material comprises a light absorbing binder material.

4. The computer-based system of claim 1, wherein said binder material applicator comprises an ink-jet type print head.

5. The computer-based system of claim 1, which further comprises a color pigment removal mechanism for automatically removing excess color pigment material from said pattern of binder material on said substrate during each stage of said dry printing operations.

6. The computer-based system of claim 1, which further comprises a color pigment alignment mechanism for automatically uniformly orienting the CLC flakes in said different-color CLC pigment material, with respect to the surface of said substrate to achieve a predetermined visual effect.

7. The computer-based system of claim 1, which further comprises a protective coat applicator for automatically applying an optically transparent protective coating to said patterns of different-color CLC pigment material applied to said pattern of binder material on said substrate so as to protect the multi-color image rendered by said patterns of different-color CLC pigment material.

8. The computer-based system of claim 1, wherein each said different-color CLC pigment material comprises a non linear pitch distribution so that said CLC flakes reflect a broad band of light.

* * * * *